Jan. 4, 1927.
N. BARRY
1,613,433
SHEET METAL PULLEY
Filed May 19, 1923      3 Sheets-Sheet 1
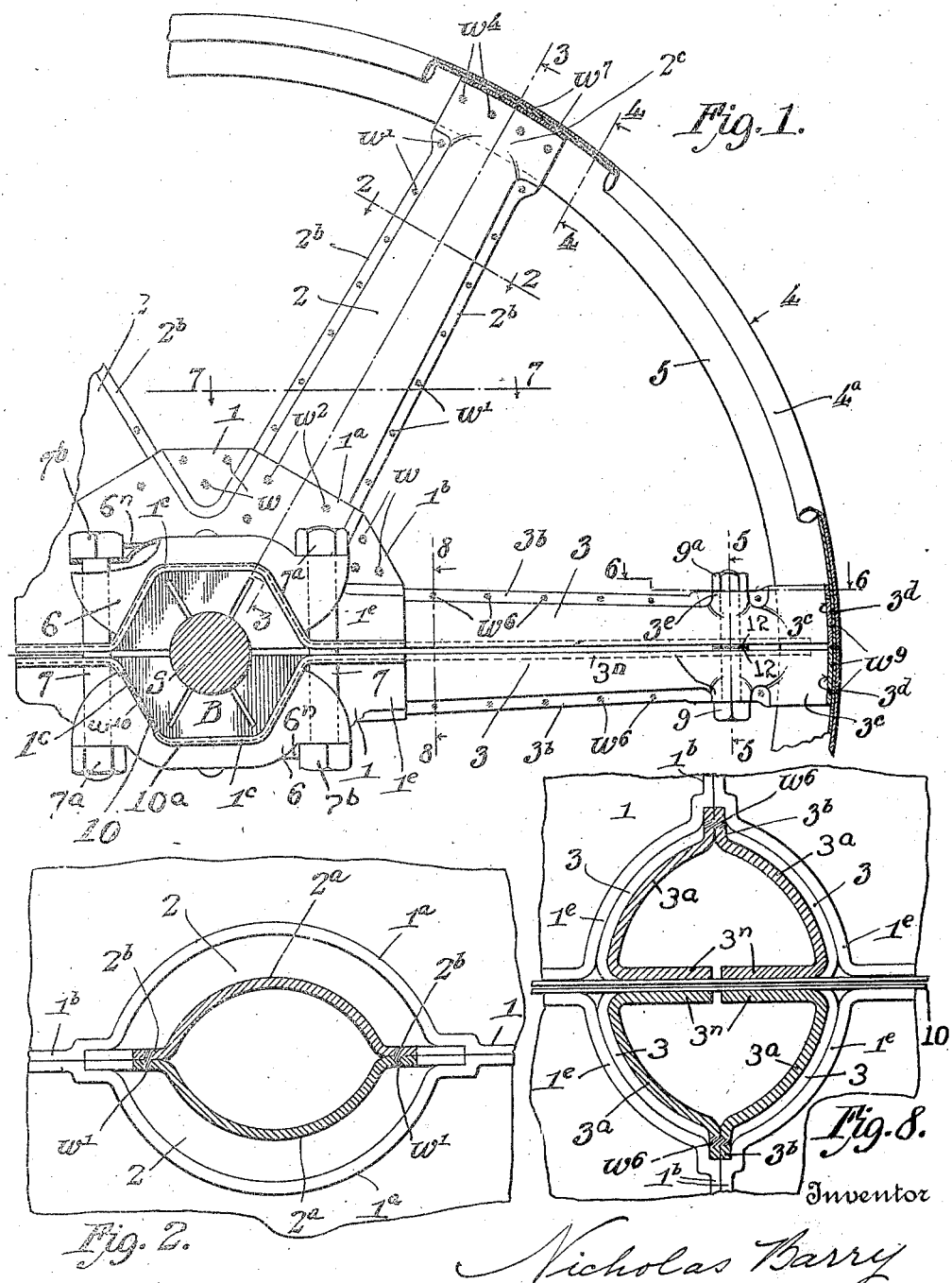

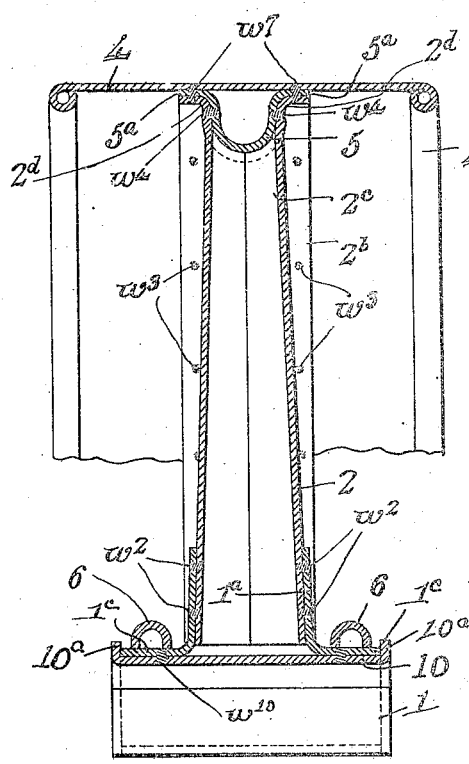
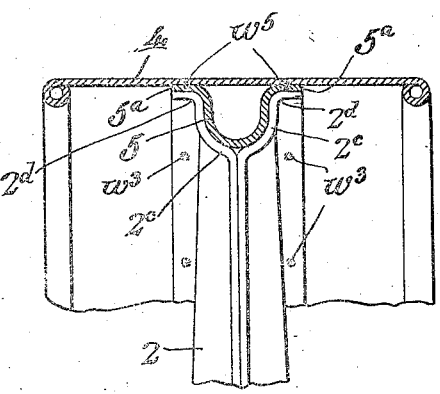
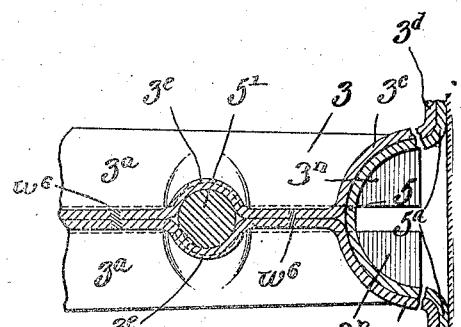
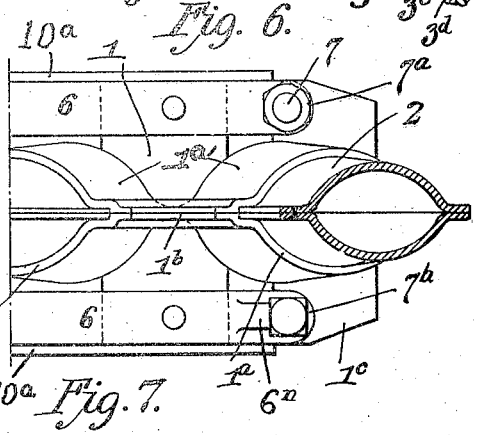
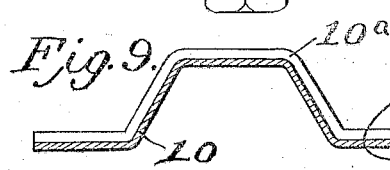

Jan. 4, 1927.　　　　　　　　　　　　　　　　　1,613,433
N. BARRY
SHEET METAL PULLEY
Filed May 19, 1923　　　3 Sheets-Sheet 3

Inventor
Nicholas Barry
By Alexander T. Lowell
Attorneys

Patented Jan. 4, 1927.

1,613,433

UNITED STATES PATENT OFFICE.

NICHOLAS BARRY, OF MUSCATINE, IOWA.

SHEET-METAL PULLEY.

Application filed May 19, 1923. Serial No. 640,144.

This invention is an improvement in pulleys and its object is to produce a simple, strong and durable pulley from sheet metal; the several parts of the pulley being pressed out of sheet steel, assembled, and preferably united by electric welding. The pulleys may be solid or split, but I preferably make them split to facilitate their attachment to or removal from a shaft, without having to disturb the shaft or the shaft-bearings.

The invention has particular reference to the construction of the pulley as a whole, and of various novel parts thereof; and I will explain one practical embodiment of the invention as illustrated in the accompanying drawings to enable others to adapt and use the same. The invention is capable of embodiment in pulleys of various sizes, and of variations in form, while retaining some or all of the essential novel features of the invention, therefore I refer to the claims, following the description for summaries of the essentials of the invention and novel features of construction and novel combinations of parts for all of which I desire protection.

In the drawings:

Fig. 1 is a part side elevation of a split pulley constructed in accordance with the invention and partly broken away.

Fig. 2 is an enlarged sectional view of one of the spokes on line 2—2, Fig. 1.

Fig. 3 is a sectional view on line 3—3, Fig. 1.

Fig. 4 is a sectional view on line 4—4, Fig. 1.

Fig. 5 is an enlarged detail sectional view on line 5—5, Fig. 1.

Fig. 6 is an enlarged sectional view on line 6—6, Fig. 1.

Fig. 7 is a sectional view on line 7—7, Fig. 1.

Fig. 8 is an enlarged sectional view on line 8—8, Fig. 1.

Fig. 9 is a detail view of a hub shell detached.

Figure 10:
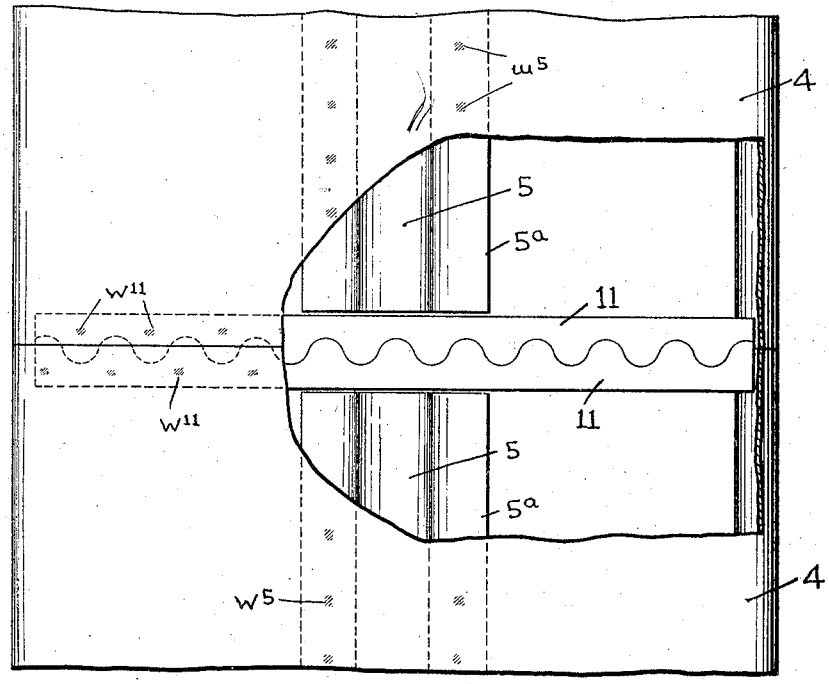
Fig. 10 is a detail view in elevation of the rim and partly in section showing the manner of joining and aligning the rim halves at the point of connection of the spokes with the rim.

As stated the pulley is made out of sheet metal, preferably sheet steel; and the hub, spoke and rim members thereof are pressed out of such metal and assembled and united, preferably by spot welding, as hereinafter explained.

In the drawings I have shown part of a split pulley made in two opposite similar halves and the description of one half will explain both. I have also indicated the pulley as having six spokes, and the halves of the pulley separating on the median longitudinal line of two of the diametrically opposite spokes.

Each half of the split pulley comprises hub members 1, spoke members 2 and 3, and a rim 4, having an internal rim strengthening fillet 5. Suitable clamps and bolts are provided for securing the hub members to and around a shaft and for bolting the opposite halves of the pulley together.

When the pulley is a split pulley, each half has a hub section formed of members 1, which meet in the median line of the plane of the pulley and are alike but placed oppositely. Each hub member 1 has half socket portions $1^a$ and $1^e$ for the reception of the inner ends of the spoke members 2 and 3; and has web portions $1^b$ between and connecting the adjacent half socket portions; the web portions $1^b$ of opposed hub members abut or meet when the opposite members 1 are placed together, see Fig. 7, and are rigidly united, preferably by spot welding as indicated at $w$ in Fig. 1.

When the opposite members 1 of the same half of the pulley are united, the parts $1^a$ form sockets for the reception of the inner ends of the spoke members 2 and 3.

Each hub member 1 preferably has a laterally projecting angular flange $1^c$ on its outer end and inner edge. These flanges surround a split bushing B of any suitable kind which is interposed between the hub member and the shaft S upon which the pulley is mounted, as shown in Fig. 1.

With each hub member I preferably employ a hub shell 10, as indicated in Figs. 1 and 3, which shell is preferably stamped out of sheet steel and corresponds in contour to the interior surface of the flanges $1^c$ of the hub member; and preferably each shell is rigidly secured to the hub member by means of spot welds, as indicated at $w^{10}$ in Figs. 1 and 3. These members 10 are preferably provided with upturned flanges $10^a$ on their outer edges which flanges abut against the outer edges of the angular flanges 1ᶜ as indicated in Figs. 1 and 3. These shells stiffen the flanges and also increase the compression surface contacting with the bushings B.

The rim 4 is made of sheet metal and preferably has its edges turned inward to form integral stiffening beads 4ᵃ at each side.

The rim of the pulley is provided with an internal circumferential strengthening fillet 5, which is disposed at the center of and within the rim of the pulley.

This fillet 5 is substantially U-shaped in cross section and is preferably made of pressed steel bent into U-shape, see Figs. 3 and 4, having a central U-shaped rib portion and a laterally projecting flange 5ᵃ at each side thereof and this fillet is rigidly attached to the center of and within the rim 4, preferably by spot welding it thereto as indicated at $w^5$.

Each spoke 2 is preferably formed of two similar opposed longitudinal sections 2ᵃ (Fig. 2) which are concavo-convex and are provided on their meeting edges with outwardly flaring parallel flanges 2ᵇ; the flanges 2ᵇ on opposite sections 2ᵃ abutting and being preferably united by seam welding, or by spot welding, as indicated at $w'$, to rigidly unite them and form a tubular spoke. The inner end of each spoke 2 is fitted within a socket 1ᵃ of the related hub member, as shown in Figs. 1, 2, 3, and may be united thereto by spot welding as indicated at $w^2$; a sufficient number of these welds being made to rigidly and permanently unite the spokes 2 to the hub section.

The outer end of each spoke member 2ᵃ is shaped as at 2ᶜ to conform with and fit to and over the opposed surface of the fillet 5, see Figs. 1–3, and 4, and may be rigidly attached thereto, preferably by spot welding as indicated at $w^4$ (Figs. 1 and 3). The outer ends of spoke members 2ᵃ, which fit over and against the rib, see Figs. 3 and 4, are provided with outwardly projecting flanges 2ᵈ which fit against and within the flanges 5ᵃ of the fillet and are rigidly secured thereto and to the rim, preferably by means of spot welds $w^7$ (Figs. 1 and 3).

The socket members 1ᵉ of the hub 1 are about half the size of the socket members 1ᵃ, and each spoke 3 resembles in exterior form one-half of a spoke 2 viewed from the face of the pulley.

Each spoke 3 is composed of similar opposite members 3ᵃ (Figs. 5, 6, 8) having flanges 3ᵇ on their meeting edges, which may be united by seam welds or spot welds, the latter being indicated at $w^6$ in Figs. 1 and 6.

The edges of the parts 3ᵃ of the spokes 3 are provided with inwardly projecting flanges 3ⁿ, as indicated in Figs. 6 and 8 which flanges almost meet. Such flanges greatly enhance the strength of the spoke members 3ᵃ, and correspondingly stiffen and strengthen the spokes 3. The outer end of each spoke member 3 has a portion 3ᶜ shaped to fit over the fillet 5, and flanges 3ᵈ which are rigidly secured to the fillet flanges and rim, preferably by spot welds $w^9$ (Figs. 1 and 6). The parts 3ᵇ, 3ᶜ, 3ᵈ of the spokes 3 substantially correspond to the parts 2ᵇ, 2ᶜ, 2ᵈ of the spokes 2.

The spokes 3 are used in split pulleys, and at the meeting sides of the halves of such pulleys, so that the spokes 3 of opposed halves of pulleys lie opposite each other (see Figs. 1 and 8). Each spoke 3ᵃ is preferably formed with a boss 3ᵉ near its outer end, adjacent the rim, for the engagement of tie bolt 9 (Figs. 1 and 5) by which the outer ends of the spokes 3 on opposed halves of the pulleys may be bolted together.

When opposite pulley halves constructed as described are juxtaposed on opposite sides of a shaft angular clamp members or yokes 6 are fitted over the projecting hub end flanges 1ᶜ of the hub members, and the opposed clamp members 6 are provided with openings near their ends for the passage of bolts 7, as indicated in Figs. 1 and 7.

The clamp 6 is preferably provided adjacent and at the inner sides of one of the bolt openings with a projection 6ⁿ (see Figs. 1 and 6) against which the bolt head 7ᵇ abuts, so that when the bolts are secured in place by the fastening nuts 7ᵃ, the bolts are effectively prevented from turning.

The clamps 6 and bolts 7 secure the hub and central portion of the pulley halves securely to the shaft S by clamping the bushing B thereon; while the outer or abutting edges of the pulley halves are securely fastened together by the bolts 9 and nuts 9ᵃ.

Washers 12, 12 are inserted between the edges 3ⁿ of the spokes, and are carried by the bolts 9, to prevent the edges of the spokes being drawn together.

Figure 11:
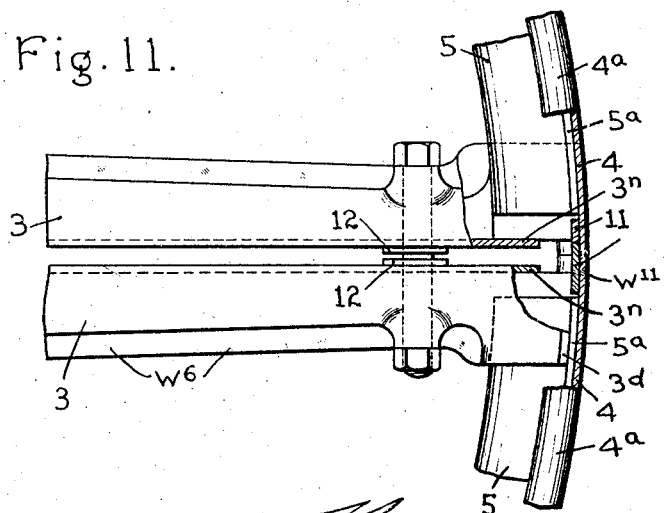
Fig. 11 is a view partly in vertical section and in elevation, illustrating the joint between the rim halves.

Referring to Figures 10 and 11, the rim 4, is provided on the inner surface thereof and at the inner edge with plates 11, 11, spot welded to the rim, as at $w^{11}$. These plates 11 are provided with scallop or undulating edges projecting on the opposing half of the rim. The scallop or undulating edges of the adjoining plates 11 interlock and thereby align the two pulley halves.

The overlapping or interlocking of the two halves of the rim aligns the rims in diameter and acts as a strengthener against compression strains, and makes it impossible to reverse the two halves when assembling.

In previous pulley made by me I formed the tubular spokes out of one piece of metal and had their outer ends entered into sockets formed in the fillet. In the present construction the fillet is continuous throughout and is not weakened by any sockets or perforations; and the outer ends of the spokes are formed to fit to and over the fillet, and are securely united thereto and to the rim. This novel construction produces a very rigid strong and light sheet metal pulley, which can be manufactured very economically.

What I claim is:

1. For a sheet metal pulley a spoke formed of opposite concavo-convex sheet metal members provided with flanges on their meeting edges and near their outer ends with opposed semi-cylindrical bosses with meeting edges for a retaining bolt, the axis of the bolt lying in the plane of the meeting edges of the members.

2. For a sheet metal pulley a spoke formed of opposite concavo-convex sheet metal members provided with flanges on their meeting edges having opposed semi-cylindrical bends near their outer ends together forming a passage for a retaining bolt, the axis of the bolt lying in the plane of the meeting edges of the members.

3. For a sheet metal pulley a spoke formed of opposite concavo-convex sheet metal members provided with flanges on their meeting edges united by welding; said flanges having opposed semi-cylindrical bends near their outer ends together forming a passage through the spoke for a retaining bolt, the axis of the bolt lying in the plane of the meeting edges of the members.

4. In a sheet metal pulley, a rim having a fillet; and spokes formed of opposite sheet metal members having their meeting edges lying in the central transverse plane of the pulley, and provided with flanges on their meeting edges united by welding; each member having its outer end shaped to fit to and over the fillet on the rim.

5. In a sheet metal pulley, a rim having a fillet; and spokes formed of opposite sheet metal members having their meeting edges lying in the central transverse plane of the pulley, and provided with flanges on their meeting edges united by welding; each member having its outer end shaped to fit to and over the fillet on the rim and having outwardly projecting flanges adapted to be secured to the fillet and the rim by welding.

6. For a pulley, hub members, each composed of pressed sheet metal sections provided with socket portions for the engagement of the inner ends of the spokes; and flanges; the socket portions at the ends of the sections corresponding approximately to one half of an intermediate socket portion.

7. For a pulley, hub members, each composed of pressed sheet metal sections provided with socket portions for the engagement of the inner ends of the spokes; and flanges; the socket portions at the side edges of the flanges corresponding approximately to one-half of an intermediate socket portion, and a hub shell fitted to the inner side of each hub section and secured thereto, the outer edges of the shell being upturned against the outer edges of the flanges.

8. A pulley, comprising hub members, each composed of pressed sheet metal sections provided with socket portions for the engagement of the inner ends of the spokes and flanges; the socket portions at the side edges of the flanges corresponding approximately to one-half of an intermediate socket portion; a rim member; spokes engaging the intermediate socket portions and rim, and smaller spokes engaging the side socket portions and the rim, and means for clamping the hub members and the smaller spokes together.

9. In a split pulley as set forth in claim 8, a clamp member having perforations for the passage of clamping bolts, and a lug adjacent the perforation adapted to prevent the bolt turning.

10. In a pulley, hub members each composed of pressed sheet metal sections provided with socket portions for the engagement of the inner ends of spokes and exterior flanges for engagement of clamps; a rim member; a fillet connected to the rim; and spokes each composed of concavo-convex members united, the outer end of each spoke being bent to fit to and over the opposed portion of the fillet and being secured to the fillet and rim.

11. In a pulley, hub members, each composed of pressed sheet metal sections, provided with socket portions for the engagement of the inner ends of spokes, intermediate web portions, and exterior flanges for engagement of clamps; a rim; a fillet provided with flanges on its sides connected to the rim; and spoke members each composed of concavo-convex members provided with flanges on their meeting edges, the inner end of each spoke member being fitted in a socket in the hub and secured thereto, and the outer end of each spoke member being bent to fit to and over the opposed portion of the fillet and having a flange secured to the fillet and rim.

12. In a pulley; hub members, each composed of pressed sheet metal sections, provided with socket portions and intermediate web portions, and exterior flanges for engagement of clamps, the socket portions forming sockets for the engagement of the inner ends of spokes; a rim member; a U-shaped fillet provided with flanges on its sides connected to the rim; and spoke members each composed of concavo-convex members provided with flanges on their meeting edges united by electric welds, the inner end of each spoke member being fitted in a socket in the hub and secured thereto by electric welds, and the outer end of each spoke member being bent to fit to and over the opposed portion of the fillet and having a flange secured to the fillet and rim by electric welds.

13. A pulley comprising a hub composed of opposite pressed sheet metal sections provided with socket portions and intermediate web portions, and having exterior flanges for engagement of clamps; said sections being united so that the socket-portions form sockets for the engagement of the inner ends of spokes; a rim member; a fillet provided with flanges on its sides connected to the rim; and spokes each composed of opposed concavo-convex members provided with flanges on their meeting edges, the inner end of each spoke being secured in a socket in the hub and outer end of each spoke member being bent to fit the opposed portion of the fillet and having a flange engaging the flange of the fillet.

14. In a split pulley, the combination of opposed pulley halves each comprising a hub member composed of opposite pressed sheet metal sections provided with socket portions and intermediate web portions, and having exterior flanges for engagement of clamps; said members being united; a rim member, a central U-shaped fillet provided with flanges on its sides connected to the rim member; and spokes each composed of opposed concavo-convex members provided with flanges on their meeting edges, the inner end of each spoke member being secured in a socket in the hub and the outer end of each spoke member being bent to fit the opposed portion of the fillet and having a flange engaging the flange of the fillet; with clamps and bolts uniting the hub-members of the opposed pulley halves, and bolts uniting the adjacent spokes of such pulley halves, substantially as described.

15. A pulley comprising a hub composed of opposite pressed sheet metal sections provided with socket portions and intermediate web portion, and having exterior flanges for engagement of clamps; said sections being united by electric welds so that the socket-portions form sockets for the engagement of the inner ends of spokes; a rim member; a central U-shaped fillet, provided with flanges on its sides connected to the rim by electric welds; and spokes each composed of opposed concavo-convex members provided with flanges on their meeting edges united by electric welds; the inner end of each spoke being secured in a socket in the hub by electric welds, and the outer end of each spoke member being bent to fit the opposed portion of the fillet and having a flange engaging the flange of the fillet and secured to the fillet and rim by electric welds.

16. In a split pulley, the combination of opposed pulley halves each comprising a hub member composed of opposite pressed sheet metal sections provided with socket portions and intermediate web portions, and having exterior flanges for engagement of clamps; said members being united by electric welds; a rim member; a central U-shaped fillet provided with flanges on its sides connected to the rim member by electric welds; and spokes each composed of opposed concavo-convex members provided with flanges on their meeting edges united by electric welds; the inner end of each spoke member being secured in a socket in the hub by electric welds and the outer end of each spoke member being bent to fit the opposed portion of the fillet and having a flange engaging the flange of the fillet and secured to the fillet and rim by electric welds; with clamps and bolts uniting the hub-members of the opposed pulley halves; and bolts uniting the adjacent spokes of such pulley halves, substantially as described.

In testimony that I claim the foregoing as my own I affix my signature.

NICHOLAS BARRY.